United States Patent [19]

Nakanowatari et al.

[11] Patent Number: 4,723,839
[45] Date of Patent: Feb. 9, 1988

[54] LIQUID CRYSTAL LIGHT VALVE

[75] Inventors: Jun Nakanowatari, Miyagi; Mitsuru Kano, Furukawa, both of Japan

[73] Assignee: Alps Electric Co., Ltd., Tokyo, Japan

[21] Appl. No.: 798,583

[22] Filed: Nov. 15, 1985

[30] Foreign Application Priority Data

Nov. 15, 1984 [JP] Japan .................. 59-241474

[51] Int. Cl.$^4$ .................. G02F 1/135; C09K 3/34
[52] U.S. Cl. .................. 350/341; 252/299.5; 252/299.63; 350/340; 350/350 S
[58] Field of Search .................. 350/340, 341, 350 S, 350/330; 252/299.5, 299.63

[56] References Cited

U.S. PATENT DOCUMENTS

| | | |
|---|---|---|
| 4,128,313 | 12/1978 | Cole, Jr. et al. .................. 350/341 |
| 4,563,059 | 1/1986 | Clark et al. .................. 350/330 |
| 4,583,826 | 4/1986 | Petrzilka et al. .................. 350/350 S |
| 4,626,375 | 12/1986 | Demus et al. .................. 350/350 S |
| 4,634,228 | 1/1987 | Iwasaki et al. .................. 350/341 |
| 4,639,089 | 1/1987 | Okada et al. .................. 350/350 S |

Primary Examiner—John K. Corbin
Assistant Examiner—Martin Lerner
Attorney, Agent, or Firm—Guy W. Shoup

[57] ABSTRACT

A liquid crystal light valve has two base plates of glass and transparent electrodes formed thereon with a ferroelectric liquid crystal interposed between the electrodes, wherein one of the electrodes has a film of insulative material oriented in a specific direction through rubbing treatment, and the other electrode has a film of insulative material treated with a coupler material for horizontal orientation but not oriented in a specific direction.

2 Claims, 6 Drawing Figures

LIQUID CRYSTAL LIGHT VALVE

BACKGROUND OF THE INVENTION

1. Field of the Invention

The present invention relates to a liquid crystal light valve, and, particularly, to a liquid crystal light valve which is suitable for a high-speed response type liquid crystal printer.

2. Description of the Prior Art

As information processing has been made higher in speed and made larger in capacity, printers have been required to have high printing quality. As printers in accord with the requirement, there have been developed a laser printer, a LED printer, a liquid crystal printer, etc. Particularly, the liquid crystal printer is not restricted with respect to the kind of light source as well as the wavelength thereof since the light source of the printer is provided independent of the printer. In comparison with the LED printer, etc., the liquid crystal printer has such advantages that the design of a photosensitive drum or the like is simple and the total cost of a printer system is therefore low.

As a liquid crystal printer, a double-frequency driven printer in which a high frequency and a low frequency are changed over in an on-period and an off-period respectively, is available on the market now. In the printer of this type, it is required to selectively apply two kinds of frequencies, which makes the driving system complicated. On the contrary, a high-speed response type liquid crystal light valve employing ferroelectric liquid crystals can be driven in a direct-current electric field and can be operated by a simple driving system. As to those ferroelectric liquid crystal light valves, some examples have been reported, but most ferroelectric liquid crystals have been chemically unstable at room temperature and nothing has been practicable.

SUMMARY OF THE INVENTION

An object of the present invention is therefore to solve the above-discussed problems in the prior art.

Another object of this invention is to provide a liquid crystal light valve performing its operation steadily at room temperature by using a simple driving circuit.

The foregoing objects of this invention can be attained by a liquid crystal light valve comprising a ferroelectric liquid crystal interposed between two base plates of glass which have transparent electrodes formed inside respectively, one of the base plates having a layer oriented in a specific direction, and the other of the base plates having a layer which is not oriented in a specific direction but subject to only horizontal orientation treatment.

These and other objects and many of the attendant advantages of the present invention will be readily appreciated as the same becomes better understood by reference to the following detailed description when considered in connection with the accompanying drawings.

DETAILED DESCRIPTION OF THE PREFERRED EMBODIMENTS

According to a preferred embodiment of the invention, the ferroelectric liquid crystal is composed of three components, that is, (S)-p-2-methylbutoxy-phenyl p-n-hexyloxy benzoate (hereinafter abbreviated to "PEP 605*0"), (s)-p-2-methylbutoxy-phenyl p-n-octyloxy benzoate (hereinafter abbreviated to "PEP 805*0"), and p-(n-octyloxy)-phenyl p-n-octyloxy benzoate (hereinafter abbreviated to "PEP 8080").

Generally, it has been considered to be most difficult to make a homogeneously oriented cell by use of a ferroelectric liquid crystal having a chiral-smectic C phase. However, by the orienting method according to the present invention, it becomes possible to form a homogeneously oriented cell wherein the optical axes are uniform in one direction.

The orienting method according to the present invention is compared with other methods as shown in the following Table.

TABLE

| ORIENTING METHOD | ESTIMATION OF ORIENTATION STATE |
|---|---|
| SAMPLE 1 Polyimide films are formed on both side base plates and the both side base plates are subject to rubbing in the same direction. | X (There exist two states where the optical axes are inclined at angles $\theta$ and $-\theta$ with respect to the direction of rubbing.) |
| SAMPLE 2 Polyimide films are formed on both side base plates and assembling is performed without subject to rubbing processing. | X (There are many domains where optical axes are inclined at random angles with respect to direction of rubbing.) |
| EMBODIMENT OF THE INVENTION Polyimide films are formed on both side base plates and one of the both side base plates is subject to rubbing processing. | O (There is a homogeneous orientation state where optical axes are somewhat inclined with respect to the direction of rubbing.) |

By rubbing orientation on only one side of the base plates as shown in the Table, it becomes possible to produce a homogeneously oriented liquid crystal cell with a good reproducibility.

In the case where a liquid crystal light valve is used as a light shutter in a printer head, the liquid crystal valve is required to have a high light transmission property at its opening time as well as a high-speed response so as to reduce the loss of light energy of a light source. When an optical anisotropic substance is put between crossed nicols, the transmission intensity I of monochromatic light can be calculated from the following formula:

$$I = I_0 \sin^2 2\theta \cdot \sin^2 \{(\pi \Delta n d)/\lambda\}$$

where $\theta$ represents the inclination angle of the optical axis, d a cell gap, $\lambda$ the wavelength of sample light, and $I_0$ the light intensity after the light has passed through a pair of polarizing plates.

Figure 6:
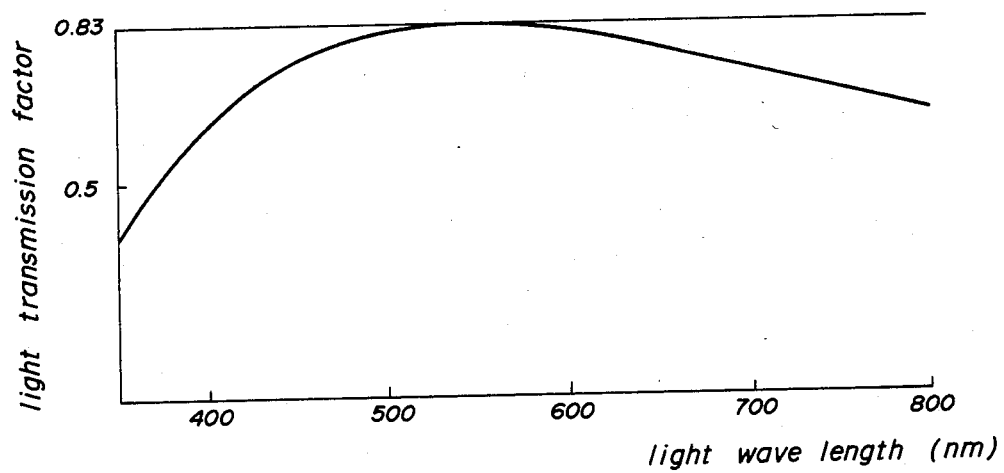
FIG. 6 is a graph showing the dependence of light transmission factor on light wavelength in the liquid crystal light valve.

When the inclination angle $\theta$ is 45°, the formula can have a maximum value with $\sin^2 2\theta = 1$. In the case where the ferroelectric liquid crystal is composed of three components, that is, PEP 605*0, PEP805*0, and PEP 8080, the inclination angle can take a value of about 34° and $\sin^2 (2 \times 34°) = 0.86$. In comparison with the inclination angle 22.5° ($\sin^2 (2 \times 22.5°) = 0.5$) of a DOBAMBC-group liquid crystal, it is possible to obtain a large value of light transmission factor at opening time. This characterizes the ferroelectric liquid crystal composed of PEP 605*0, PEP 805*0, and PEP 8080. That is, the liquid crystal can have a high light transmission factor at opening time and it can function as a liquid crystal light valve sufficiently. The measured result of refractive index anisotropy of this liquid crystal is 0.135. FIG. 6 shows the dependence of light transmittance on light wavelength in this liquid crystal cell in the case where a cell gap is 2 $\mu$m.

Referring now to the drawings, an embodiment of the present invention will be described hereunder.

Figure 1:
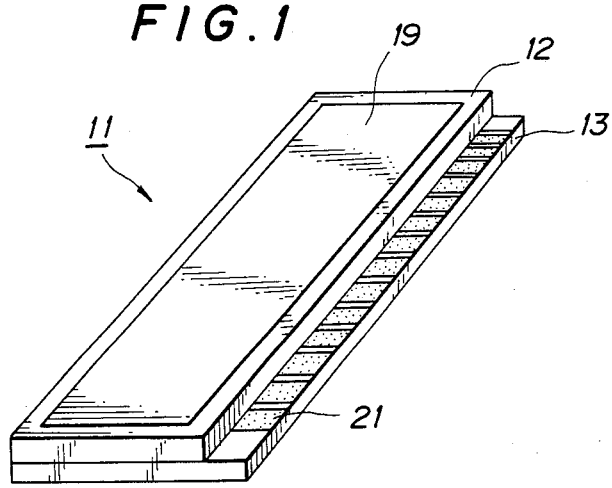
FIG. 1 is a perspective view of a liquid crystal light valve in an embodiment according to the present invention.
Figure 2:
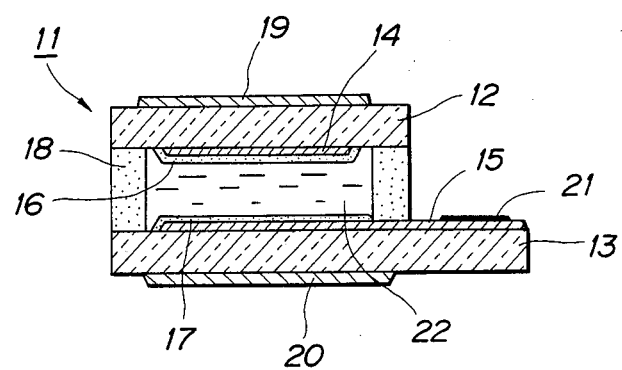
FIG. 2 is a sectional view of the liquid crystal light valve.

FIGS. 1 and 2 show a liquid crystal light valve 11 according to an embodiment of the invention. The liquid crystal light valve 11 has a pair of glass base plates 12 and 13. An electrode 14 of a common side is formed on the inner surface of the glass base plate 12, and an electrode 15 of a segment side is formed on the inner surface of the glass base plate 13. Each of the electrodes 14 and 15 is made of an evaporated film of indium oxide, and more specifically, the electrode 15 is made of an evaporated film of indium oxide etched along a predetermined pattern. The common side electrode 14 is coated with a layer 16 of a polyimide resin film oriented in a specific direction through rubbing treatment. The segment side electrode 15 is coated with a layer 17 of a silicon oxide film treated with a silane-group coupler for horizontal orientation but not oriented in a specific direction. The glass base plates 12 and 13 are connected to each other through a not-shown spacer by a sealing adhesive agent 18 made of epoxy resin. The distance between the glass base plates 12 and 13 is kept at 2 $\mu$m by the not-shown spacer. Polarizing plates 19 and 20 are provided on the outer surfaces of the glass base plates 12 and 13 respectively such that their polarization directions each other at 90°. The reference numeral 21 designates connection terminals for external circuits, each terminal being forming by coating a transparent electrode with nickel by electrolytic plating. A ferroelectric liquid crystal 22 composed of three components, that is, PEP 605*0, PEP 805*0, and PEP 8080, is injected with a ratio of 1:1:1 into a liquid crystal cell.

The liquid crystal 22 formed a chiral-smectic C phase at a temperature within a range from 25° C. to 36.5° C. When a rectangular wave voltage of $+8$ V and $-8$ V was applied to the liquid crystal light valve 11 without providing the polarizing plates 19 and 20, the inclination of the optical axis made a change within an angle of 34 degrees.

Figure 3:
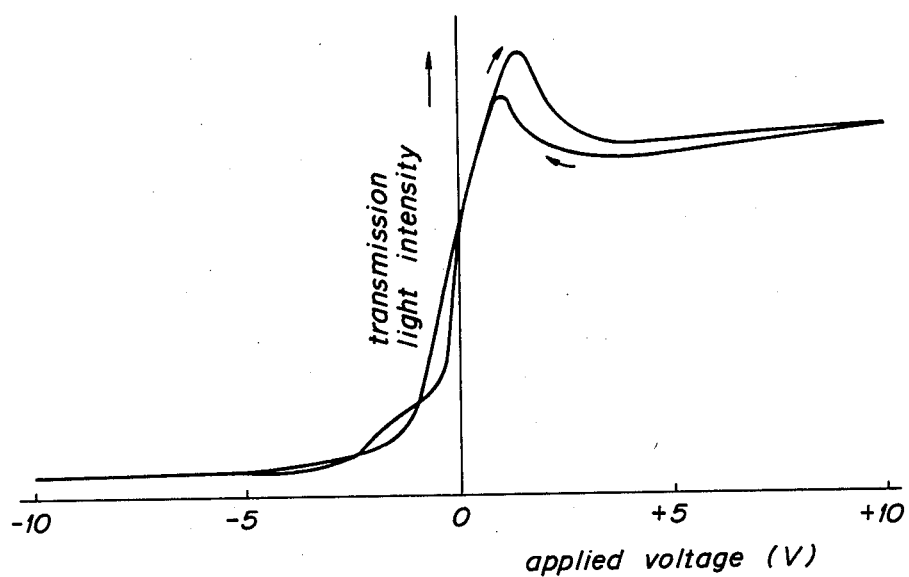
FIG. 3 is a graph showing an applied voltage versus light transmission characteristic in the liquid crystal light valve.

NPF1100 (trade name of products by NITTO DENKO) was employed as the polarizing plates 19 and 20. The polarizing plates 19 and 20 were disposed such that their polarization directions could intersect each other at 90° and the transmission light intensity was measured. The result of measurement showed a contrast ratio of 17.5. FIG. 3 shows the characteristic of the transmission light intensity versus applied voltage measured in the liquid crystal light valve 11.

Figure 4:
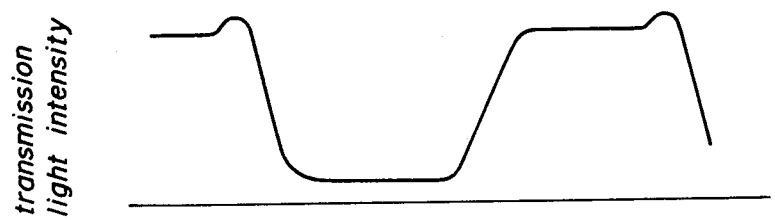
FIG. 4 is a graph showing the result of measured transmission light intensity in accordance with an applied voltage to the liquid crystal light valve.
Figure 5:
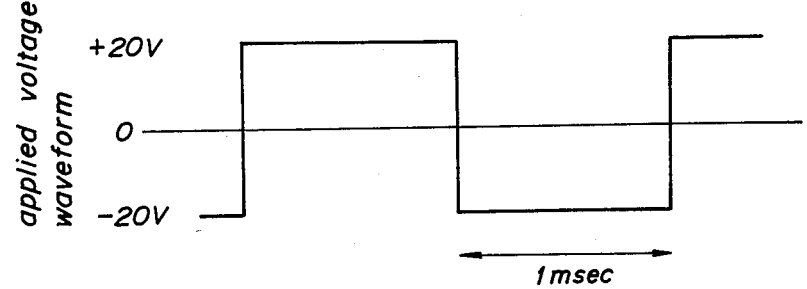
FIG. 5 is a graph showing the waveform of the applied voltage of FIG. 4.

Next, a rectangular wave voltage of 20 V was applied to the liquid crystal light valve 11 to cause the light valve 11 to operate at 33° C. The liquid crystal light valve 11 responded at a speed of about 300 $\mu$sec both in rising time and in falling time. FIG. 4 shows the result of measured transmission light intensity in accordance with the voltage applied to the liquid crystal light valve 11, and FIG. 5 shows the waveform of the voltage applied to the liquid crystal light valve 11.

After the liquid crystal light valve 11 was tested at 80° C. for 500 hours, or after tested under the conditions of 60° C. and humidity of 95% for 200 hours, the liquid crystal 22 showed no changes in phase-transition temperature, in orientation state, and in operation characteristic. This fact shows high reliability.

As described above, according to the present invention, it is possible to provide a homogeneously oriented cell by using a ferroelectric liquid crystal having a chiral-smectic C phase, for example, a liquid crystal composed of PEP 605*0, PEP 805*0, and PEP 8080. Moreover, by using the ferroelectric liquid crystal, it is possible to increase the light transmission factor at opening time and to increase the response speed to the applied voltage, so that the liquid crystal can operate steadily at room temperature. Therefore, the liquid crystal light valve according to the present invention is applicable to liquid crystal printers since the liquid crystal light valve can be caused to operate at a high speed at room temperature by a simple driving circuit.

What is claimed is:

1. A liquid crystal light valve comprising:
   two transparent, spaced apart base plates of glass having respective transparent electrode layers formed on their inner surfaces facing opposite each other;
   a ferroelectric liquid crystal interposed between said electrodes of said base plates; and
   one of said electrodes having a film of insulative material formed thereon oriented in a specific direction through rubbing treatment, and the other of said electrodes having a film of insulative material treated with a coupler material for horizontal orientation but not oriented in a specific direction.

2. A liquid crystal light valve according to claim 1, wherein said ferroelectric liquid crystal is composed of three components, that is, p-(act-amyloxy)-phenyl p-n-hexyloxy benzoate, (s)-p-2-methylbutoxy-phenyl p-n-octyloxy benzoate, and (s)-p-2-methylbutoxy-phenyl p-n-octyloxy benzoate.

* * * * *